(12) United States Patent  (10) Patent No.: US 8,367,263 B2
Yoshihara et al.  (45) Date of Patent: Feb. 5, 2013

(54) FUEL CELL, FUEL CELL APPARATUS, VEHICLE AND CO-GENERATION SYSTEM INCLUDING THE SAME AND FUEL CELL OPERATION METHOD

(75) Inventors: Yoshinobu Yoshihara, Konan (JP); Yasufumi Nakanishi, Jyoyo (JP)

(73) Assignee: Ritsumeikan Trust, Kyoto (JP)

( * ) Notice: Subject to any disclaimer, the term of this patent is extended or adjusted under 35 U.S.C. 154(b) by 1100 days.

(21) Appl. No.: 12/223,542

(22) PCT Filed: Feb. 1, 2007

(86) PCT No.: PCT/JP2007/051689
§ 371 (c)(1),
(2), (4) Date: Aug. 1, 2008

(87) PCT Pub. No.: WO2007/088925
PCT Pub. Date: Aug. 9, 2007

(65) Prior Publication Data
US 2009/0050382 A1    Feb. 26, 2009

(30) Foreign Application Priority Data
Feb. 2, 2006   (JP) .................... 2006-026033

(51) Int. Cl.
*H01M 8/04*    (2006.01)
(52) U.S. Cl. ......................................... 429/443
(58) Field of Classification Search .............. None
See application file for complete search history.

(56) References Cited

U.S. PATENT DOCUMENTS

| | | | | |
|---|---|---|---|---|
| 5,958,616 A | * | 9/1999 | Salinas et al. | 429/494 |
| 2002/0058168 A1 | * | 5/2002 | Voss et al. | 429/13 |
| 2003/0003336 A1 | * | 1/2003 | Colbow et al. | 429/24 |

FOREIGN PATENT DOCUMENTS

| | | |
|---|---|---|
| JP | 10-334930 | 12/1998 |
| JP | 11-040179 | 2/1999 |
| JP | 11-214018 | 8/1999 |
| JP | 2002-313357 | 10/2002 |
| JP | 2003-249256 | 9/2003 |
| JP | 2004-071312 | 3/2004 |
| JP | 2004-071315 | 3/2004 |
| JP | 2004-139936 | 5/2004 |
| JP | 2004-207007 | 7/2004 |
| JP | 2004-273345 | 9/2004 |

* cited by examiner

*Primary Examiner* — Barbara Gilliam
*Assistant Examiner* — Stephan Essex
(74) *Attorney, Agent, or Firm* — Clark & Brody (57) ABSTRACT

A fuel cell apparatus is capable of quickly heating a solid electrolyte to a proper temperature in order to perform effective electric power generation. The apparatus includes a fuel cell (1) for generating electric power by cell reacting a fuel gas on an anode-(3) side with oxygen on a cathode-(4) side. The fuel cell (1) includes a solid electrolyte (2) formed of a porous mass and uses a differential pressure to cause the fuel gas on the anode-(3) side to permeate through the solid electrolyte to the cathode-(4) side. The solid electrolyte (2) is heated by combustion reaction of the fuel gas permeated through the solid electrolyte (2) and mixed with the oxygen.

13 Claims, 7 Drawing Sheets

FUEL CELL, FUEL CELL APPARATUS, VEHICLE AND CO-GENERATION SYSTEM INCLUDING THE SAME AND FUEL CELL OPERATION METHOD

TECHNICAL FIELD

The present invention relates to a solid oxide fuel cell, a solid oxide fuel cell apparatus, vehicle and co-generation system including the same and a fuel cell operation method.

BACKGROUND ARTS

A solid oxide fuel cell (SOFC) has been known as one of devices for generating electric power by using fuel cells. The solid oxide fuel cell is superior over a proton exchange membrane fuel cell (PEMFC) in long-term stability and reliability and besides, has higher energy conversion efficiency.

However, a solid electrolyte used as a solid oxide electrolyte exhibits low ion conductivity at low temperatures and hence, need be raised to such a high temperature in the range of 1000° C. to 800° C. in order to provide for an effective power generation. Further, the conventional solid oxide fuel cell suffers from a drawback that heat loss makes it difficult for the fuel cell to perform a thermally self-sustained operation as maintaining high power generation efficiency.

In this connection, apparatuses equipped with such a solid oxide fuel cell and designed to perform the thermally self-sustained operation have been proposed in Japanese Unexamined Patent Publications No. 2004-71312 and No. 2004-71315. The thermally self-sustained operation means an operation to maintain the fuel cell at temperature above a power generation temperature for effective power generation without applying heat from an external source but relying only on heat produced by the fuel cell itself. The smaller the apparatus, the greater is the rate of heat loss. Therefore, the smaller apparatus has the greater difficulty in performing the thermally self-sustained operation and the greater tendency to be decreased in the power generation efficiency.

DISCLOSURE OF THE INVENTION

Such a fuel cell apparatus is required to heat the solid electrolyte to the power generation temperature when the apparatus is actuated to start power generation. On this account, the conventional apparatus requires additional heating means such as a burner or heater. However, even though the solid electrolyte is heated using such heating means, it takes a long time before the solid electrolyte is raised to the above-described high temperature. Hence, the conventional apparatus takes 10 to 30 minutes from startup before it provides stable electric power. Even a small apparatus takes 5 to 10 minutes before it provides stable electric power. That is, the conventional apparatuses suffer from a drawback of very slow startup. Although some of the conventional apparatuses are capable of thermally self-sustained operation once the solid electrolyte is raised to the high temperature, the thermally self-sustained operation per se requires the heating means. Namely, the heating means for heating the solid electrolyte to the high temperature in an initial stage is necessary for permitting the fuel cell to carry out the thermally self-sustained operation.

Further, fuel cell apparatuses of a small scale on the order of 1 kw suffer a particularly great heat loss even in a normal operation. It is therefore difficult for such small apparatuses to perform the thermally self-sustained operation as maintaining the high power generation efficiency. That is, the small apparatuses have difficulty in maintaining the solid electrolyte at the proper temperature.

Figure 7:
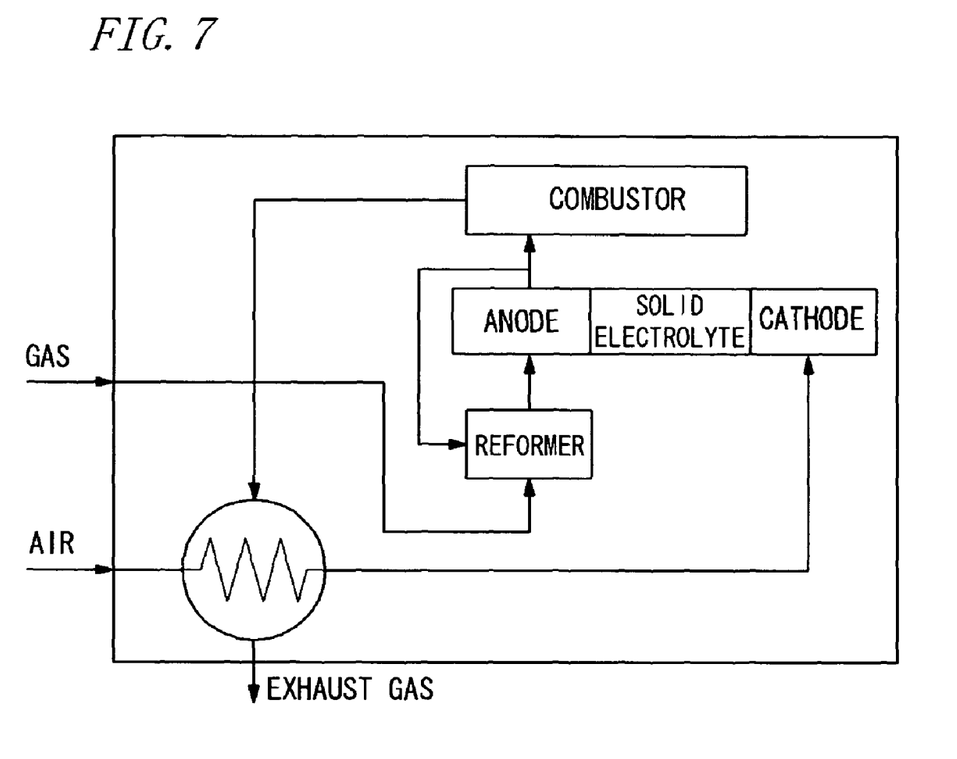
FIG. 7 is a schematic diagram showing an arrangement of a conventional fuel cell apparatus.

In order to increase the power generation efficiency, the conventional fuel cell apparatus including the fuel cell needs many attachments such as additional combustor or heat exchanger disposed externally of the fuel cell, as shown in FIG. 7. This leads to a tendency toward the size increase of the whole body of the apparatus.

In view of the foregoing, the invention seeks to provide a fuel cell and a fuel cell apparatus which are capable of raising the solid electrolyte to the proper temperature for the effective power generation, a vehicle and a co-generation system including the same, and a fuel cell operating method.

A fuel cell apparatus according to the invention comprises a fuel cell for generating electric power by cell reacting a fuel gas on an anode side with oxygen on a cathode side and is characterized in that the fuel cell includes a solid electrolyte allowing a part of the fuel gas or the oxygen to permeate therethrough as gaseous permeation between the anode side and the cathode side and that the solid electrolyte is heated by combustion reaction effected by the fuel gas or the oxygen permeated through the solid electrolyte and mixed with the oxygen or the fuel gas.

A fuel cell according to the invention comprises a solid electrolyte allowing a part of a fuel gas on an anode side or oxygen on a cathode side to permeate therethrough as gaseous permeation between the anode side and the cathode side when electric power is generated by cell reacting the fuel gas on the anode side with the oxygen on the cathode side and is characterized in that the solid electrolyte is heated by combustion reaction effected by the fuel gas or the oxygen permeated through the solid electrolyte and mixed with the oxygen or the fuel gas.

It is noted that the combustion reaction according to the invention means combustion of the mixture of the fuel gas and oxygen and is different from a cell reaction which takes place on the anode side as the electrochemical reaction.

According to such fuel cell apparatus and fuel cell, when the electric power is generated by cell reacting the fuel gas on the anode side with the oxygen on the cathode side of the fuel cell, the solid electrolyte allows a part of the fuel gas or oxygen on either of the anode side and the cathode side to permeate therethrough to the other side. The gaseous permeation provides the mixture of the fuel gas and the oxygen and the heat resulting from the combustion reaction of the mixture can be used to heat the solid electrolyte. Namely, the fuel gas and oxygen for effecting the cell reaction may be used in the combustion reaction for heating the solid electrolyte.

A required energy for maintaining the solid electrolyte at the temperature for proper ion conductivity or for heating the solid electrolyte to the temperature is obtained from the combustion reaction.

The fuel gas or oxygen permeates through the solid electrolyte and is mixed with the oxygen or fuel gas to effect the combustion reaction which takes place in a part of the fuel cell or in the vicinity thereof. Therefore, the heat resulting from the combustion reaction can be imparted to the solid electrolyte, which is quickly raised to the high temperature.

Further, the invention obviates the need for the heating means such as the burner or heater for heating the solid electrolyte as well as fuel feeding means and electric wiring for the heating means, which are conventionally required as additional components. This results in the reduction of the size and weight of the fuel cell apparatus or an apparatus including the fuel cell apparatus.

It is preferred that the above fuel cell apparatus further comprises pressure controlling means for producing a differential pressure between the anode side and the cathode side.

The pressure controlling means is capable of producing the differential pressure between the anode side and the cathode side which sandwich the solid electrolyte therebetween. The differential pressure causes a part of either the anode-side fuel cell or the cathode-side oxygen to permeate through the solid electrolyte to the other side. Hence, the fuel cell apparatus can produce a predetermined differential pressure at startup so as to be able to raise the temperature of the solid electrolyte quickly. During the normal operation wherein the cell reaction takes place, the fuel cell apparatus may reduce the differential pressure so as to continue an economical and efficient cell reaction.

It is preferred that the fuel cell apparatus further comprises control means for maintaining the solid electrolyte at temperature above a power generation temperature by controlling the intensity of the combustion of the fuel gas and the oxygen, the power generation temperature at which the solid electrolyte can attain an effective ion conductivity.

In this fuel cell apparatus, the control means is capable of maintaining the solid electrolyte at temperature above a desired power generation temperature by controlling the intensity of the combustion of the fuel gas and the oxygen.

In this case, the control means may be arranged to control the intensity of the combustion of the fuel gas and the oxygen according to the ion conductivity of the solid electrolyte.

The ion conductivity of the solid electrolyte is dependent on the temperature thereof. Therefore, if the solid electrolyte is decreased in the ion conductivity, the control means is adapted to provide control to increase the intensity of the combustion thereby raising the temperature of the solid electrolyte so that the solid electrolyte can attain the predetermined ion conductivity. On the other hand, if the ion conductivity of the solid electrolyte exceeds a predetermined value, the control means is adapted to decrease the intensity of the combustion so as to maintain the power generation efficiency. Alternatively, the control means may provide control to suspend the combustion thereby permitting the fuel cell to perform the thermally self-sustained operation based on the heat produced by the cell reaction in the fuel cell.

In this case, the above control means may be arranged to adjust the amount of fuel gas or oxygen permeated through the solid electrolyte by regulating the differential pressure between the anode side and the cathode side, thereby controlling the intensity of the combustion.

The differential pressure between the anode side and the cathode side causes the fuel gas or oxygen to permeate through the solid electrolyte and hence, the amount of fuel gas or oxygen permeated through the solid electrolyte can be adjusted by increasing or decreasing the differential pressure. Accordingly, the control means makes adjustment of the amount of permeated fuel gas or oxygen by regulating the differential pressure between the anode side and the cathode side or the differential pressure between the fuel-gas side and the oxygen side, thereby controlling the intensity of the combustion.

It is preferred in the above fuel cell apparatus that the solid electrolyte is a porous mass. This permits the fuel gas or air to permeate through the whole of the solid electrolyte and to effect the combustion reaction across either an anode-side surface or a cathode-side surface of the solid electrolyte. Therefore, the whole body of the solid electrolyte can be quickly raised to the high temperature.

It is preferred that any one of the anode, the cathode and a region of the solid electrolyte of the fuel cell constitutes a combustion section. The combustion reaction of the fuel gas and oxygen takes place at the anode on one side of the solid electrolyte, at the cathode on the other side of the solid electrolyte or at the region of the solid electrolyte so that the solid electrolyte can be quickly raised to the high temperature.

In this case, the combustion section may preferably be defined as a place where flames are formed. A flame combustion reaction provides high energy such that the solid electrolyte can be raised to the temperature for the proper ion conductivity.

In this case, it is also preferred that the combustion section is the cathode. By virtue of the combustion section provided on the cathode side, the combustion reaction produces a large amount of intermediate products having high energy potentials, such as OH- and O-radicals, on the cathode side and hence, the solid electrolyte is increased in oxygen ion conductivity (oxygen ions conducted toward the anode). Accordingly, activation polarization in the cathode is suppressed so that the use of a catalyst, which is used as an electrocatalyst in a large amount, may be reduced.

It is preferred that the above fuel cell apparatus further comprises ignition means disposed on the anode side or the cathode side where the combustion reaction of the fuel gas and the oxygen takes place.

The combustion reaction of the fuel gas and the oxygen can be started by operating the ignition means. At actuation of the fuel cell apparatus, in particular, the combustion can be brought about on the cathode side or the anode side by causing either of the fuel gas and the oxygen to permeate through the solid electrolyte and operating the ignition means. Then, the heat from the combustion may be used for quickly raising the solid electrolyte to the high temperature. That is, a simple constitution provides the apparatus featuring the quick startup characteristic.

A fuel cell operating method according to the invention is characterized in that when electric power is generated by cell reacting a fuel gas on an anode side with oxygen on a cathode side by means of a solid electrolyte, a part of the fuel gas or the oxygen on one side is supplied to the other side so as to heat the solid electrolyte by combustion reaction of the supplied fuel gas or oxygen with the oxygen or the fuel gas.

According to this method, the energy required for maintaining the solid electrolyte at the temperature for the proper ion conductivity or for heating the solid electrolyte to the temperature of interest can be obtained from the combustion reaction. Therefore, the solid electrolyte can be quickly and efficiently raised to the high temperature. In addition, the fuel gas and oxygen for effecting the cell reaction may also be used for heating the solid electrolyte by the combustion reaction.

It is preferred in the fuel cell operating method that the solid electrolyte is heated by the above combustion reaction when the fuel cell starts up. In this method, the solid electrolyte can be quickly heated to the high temperature when the fuel cell starts up. Hence, the fuel cell can accomplish a quick startup of power generation.

A vehicle according to the invention may comprise the above fuel cell apparatus and an operating section operating on the electric power generated by the fuel cell apparatus. In this vehicle, the operating section may comprise on-board electric equipment and the fuel cell apparatus may be used as an auxiliary power source for supplying the electric power to the electric equipment. Alternatively, the operating section may comprise a driving section of the vehicle (vehicle motor) and the fuel cell apparatus may be used as a primary power source for supplying the electric power to the driving section.

The vehicle may further comprise: a fuel tank for storing a vehicle fuel; a vehicle driving section operating on the vehicle fuel; and a fuel feeding section for supplying a part of the vehicle fuel as the fuel gas to the anode side of the above fuel cell provided in the above fuel cell apparatus.

In this vehicle, the fuel feeding section supplies the vehicle fuel stored in the fuel tank to the fuel cell apparatus thereby permitting the fuel cell apparatus to utilize the vehicle fuel as the fuel gas for power generation.

A co-generation system according to the invention may comprise the above fuel cell apparatus and means for utilizing the heat of an exhaust gas discharged from the fuel cell apparatus. This co-generation system is adapted for an effective utilization of high-temperature waste heat from the fuel cell apparatus and hence is further improved in energy efficiency.

BEST MODES FOR CARRYING OUT THE INVENTION

The embodiments of the invention will be described hereinbelow with reference to the accompanying drawings.

Figure 1:
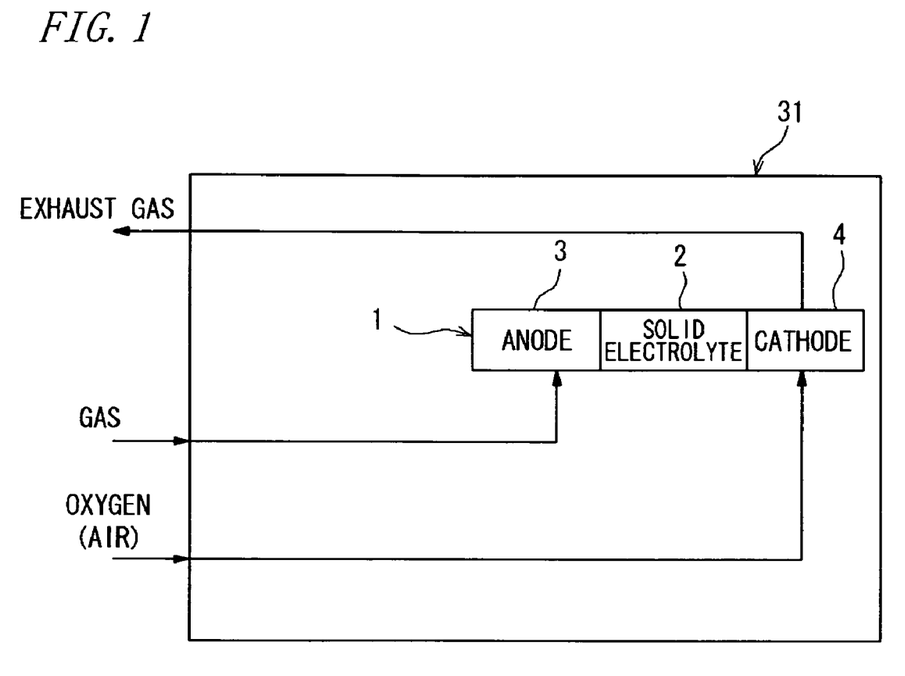
FIG. 1 is a schematic diagram showing an arrangement of a fuel cell apparatus according to one embodiment of the invention.
Figure 2:
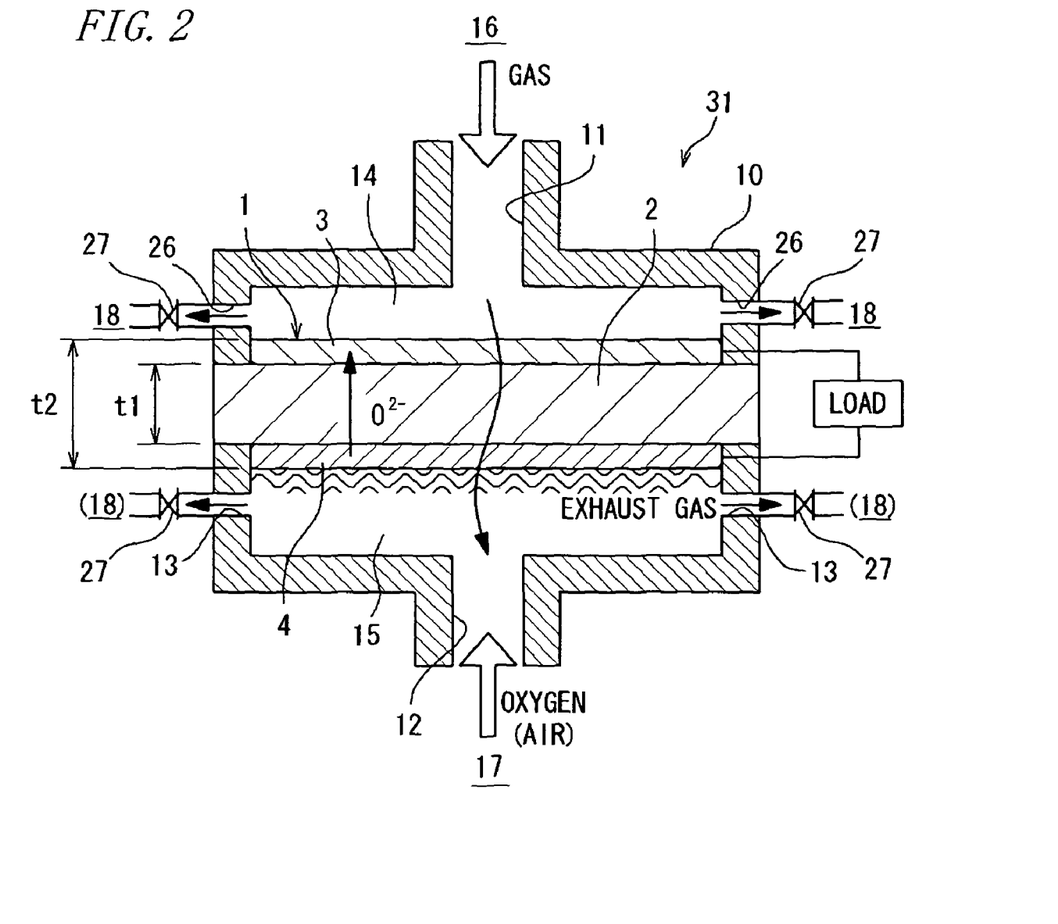
FIG. 2 is a pattern diagram showing a part of the fuel cell apparatus.
Figure 3:
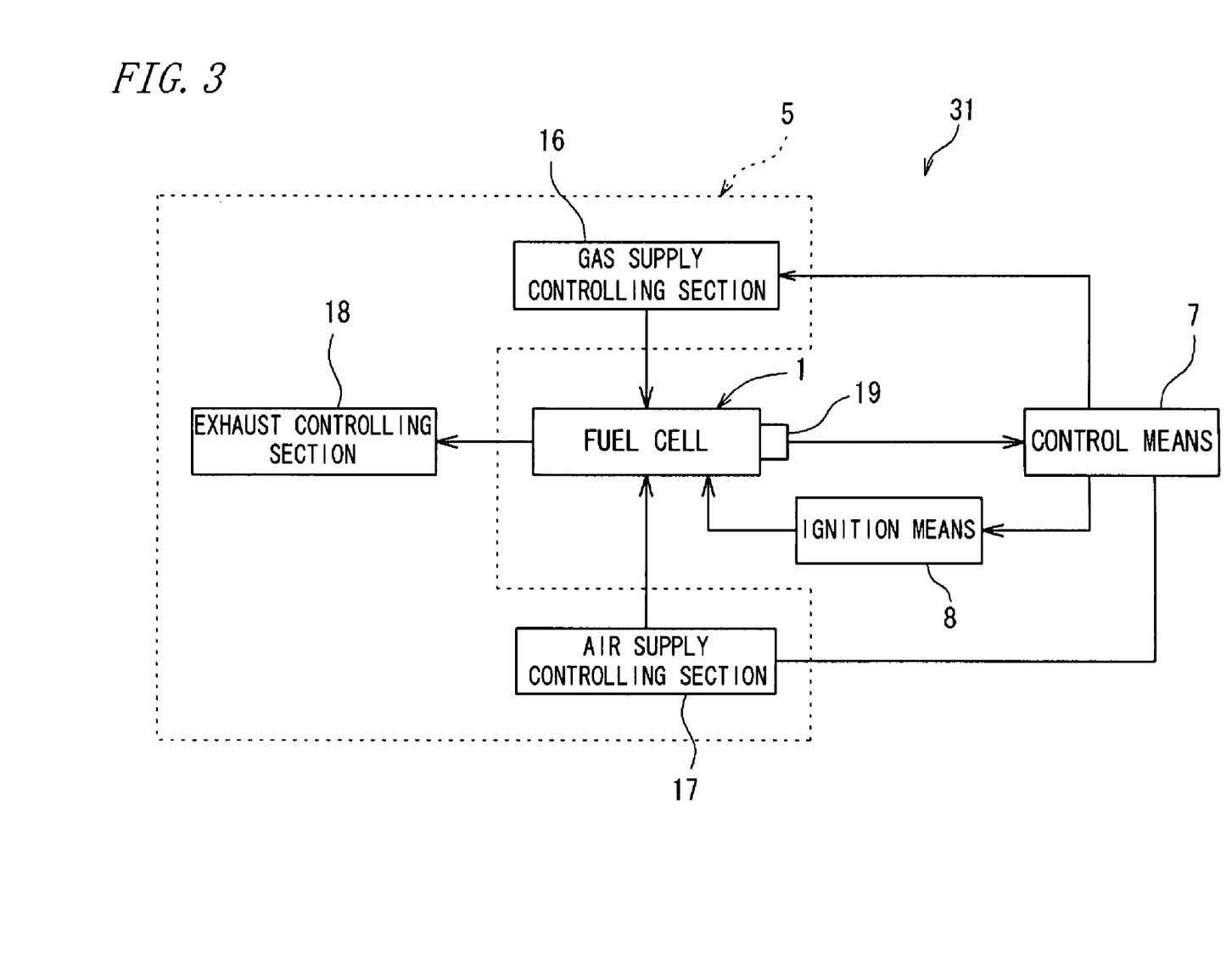
FIG. 3 is a block diagram showing a general arrangement of the fuel cell apparatus.

FIG. 1 is a schematic diagram showing an arrangement of a fuel cell apparatus according to one embodiment of the invention. FIG. 2 is a pattern diagram showing a part of the fuel cell apparatus. FIG. 3 is a block diagram showing a general arrangement of the fuel cell apparatus.

The fuel cell apparatus 31 is of a solid oxide (solid electrolyte) fuel cell (SOFC). A fuel cell 1 includes a solid electrolyte 2 having oxygen ion conductivity, an anode 3 disposed on one side of the solid electrolyte 2, and a cathode 4 disposed on the other side thereof.

Referring to FIG. 2, the fuel cell 1 is accommodated in a case 10, an interior of which is separated into an anode-3 side and a cathode-4 side by this fuel cell 1. In the case 10, a first vacant chamber 14 is defined on the anode-3 side and a second vacant chamber 15 is defined on the cathode-4 side.

Provided on the anode-3 side (at the first vacant chamber 14) of the case 10 are a first supply port 11 for supplying a fuel gas (hydrogen gas or hydrocarbon gas such as natural gas) and an outlet port 26 for discharging the fuel gas present in the first vacant chamber 14. Further, provided on the cathode-4 side (at the second vacant chamber 15) of the case 10 are a second supply port 12 for supplying air containing oxygen and an outlet port 13 for discharging an exhaust gas produced on the cathode-4 side (in the second vacant chamber 15).

Thus, the anode 3 constitutes a fuel-gas side electrode (fuel electrode) and the cathode 4 constitutes an oxygen side electrode (air electrode).

The fuel cell 1 allows oxygen on the cathode-4 side to be ionized to oxygen ions and conducted through the solid electrolyte 2 to the anode 3, thereby cell reacting the oxygen ions with the fuel gas on the anode-3 side for generating electric power.

The solid electrolyte 2 has the ion conductivity and a structure which allows a part of the fuel gas or oxygen to permeate therethrough as gaseous permeation between the anode-3 side and the cathode-4 side. The solid electrolyte 2 conventionally has a structure (airtight structure) which blocks the transfer (passage) of the fuel gas or air between the anode-3 side and the cathode-4 side. According to the invention, however, the solid electrolyte 2 has the structure provided with flow passages permitting the transfer of the fuel gas or air between the anode-3 side and the cathode-4 side. Specifically, the solid electrolyte 2 is a porous mass so that the flow passages are formed between the anode-3 side and the cathode-4 side. Both the anode 3 and the cathode 4 may be those conventionally used in the fuel cells and are porous masses. Hence, each of the anode 3 and the cathode 4 is also formed with flow passages between one side and the other side thereof. Thus, the flow passages permitting the transfer of the fuel gas or air are provided between the anode-3 side and the cathode-4 side of the fuel cell 1.

According to such a solid electrolyte 2, the fuel gas or oxygen (air) in the case 10 can be transferred between the first vacant chamber 14 and the second vacant chamber 15 only through the fuel cell 1. As an alternative constitution (not shown) to that which employs the porous solid electrolyte 2, the fuel cell may employ a solid electrolyte 2 formed with a plurality of fine through-holes permitting the transfer of the fuel gas or oxygen.

Referring to FIG. 2 and FIG. 3, the fuel cell apparatus 31 includes a pressure controlling means 5 for producing a differential pressure between the anode-3 side (the first vacant chamber 14) and the cathode-4 side (the second vacant chamber 15). The pressure controlling means 5 includes a gas supply controlling section 16 for supplying the fuel gas to the anode-3 side and an air supply controlling section 17 for supplying air to the cathode-4 side. The gas supply controlling section 16 is connected to an unillustrated fuel storage section. The gas supply controlling section 16 is adapted to convert a fuel from the fuel storage section into the fuel gas and to supply the fuel gas to the first vacant chamber 14 as controlling the flow rate, flow speed, pressure and the like of the fuel gas. The air supply controlling section 17 is adapted to supply the air from outside to the second vacant chamber 15 as controlling the flow rate, flow speed, pressure and the like of the intake air.

The pressure controlling means 5 further includes a differential pressure gauge (not shown) for detecting the differential pressure between the anode-3 side and the cathode-4 side. At least one of the gas supply controlling section 16 and the air supply controlling section 17 includes a servo valve (flow regulator not shown) operatively opened or closed according to the measurement result of the differential pressure gauge. Namely, the pressure controlling means 5 regulates the differential pressure between these electrodes using the measurement result given by the differential pressure gauge.

Referring to FIG. 2 and FIG. 3, the pressure controlling means 5 may also regulate the differential pressure between the anode-3 side and the cathode-4 side by means of an exhaust controlling section 18 thereof. In this case, the exhaust controlling section 18 includes a flow regulator 27 which is connected to an outlet port 26 for discharging the fuel gas present on the anode-3 side to the outside of the case 10. The flow regulator 27 controls the discharge amount (flow rate) of the fuel gas so as to provide a predetermined value of the differential pressure between the anode-3 side and the cathode-4 side. Specifically, when the flow regulator 27 is throttled back or closed, the internal pressure of the fuel gas supplied to the first vacant chamber 14 is increased so that the amount of fuel gas permeated through the solid electrolyte 2 is increased and the combustion reaction becomes hot. Hence, a combustion reaction is accelerated to enable the rise of the temperature of the solid electrolyte 2 and to effect the combustion reaction when the apparatus starts up. On the other hand, when the solid electrolyte 2 is raised to a predetermined temperature so that the apparatus requires combustion (heat generation) as low as to maintain the continuous operation thereof, or so that the apparatus starts a thermally self-sustained operation, the flow regulator 27 is opened to decrease the internal pressure of the fuel gas in the first vacant chamber 14 whereby the amount of permeated fuel gas is reduced or the permeation of the fuel gas is stopped. Thus, the combustion reaction is slowed down. In this manner, the amount of permeated fuel gas is varied by regulating the aperture of the flow regulator 27 whereby the intensity of the combustion reaction is adjusted. This provides for the temperature adjustment of the solid electrolyte 2.

An alternative arrangement may also be made such that the exhaust controlling section 18 includes the flow regulator 27 which is connected to the outlet port 13 for discharging the exhaust gas produced on the cathode-4 side (in the second vacant chamber 15). In this case, the flow regulator 27 controls the discharge amount (flow rate) of the exhaust gas so as to provide a predetermined value of the differential pressure between the anode-3 side and the cathode-4 side. Specifically, the internal pressure in the second vacant chamber 15 is adjusted by regulating the aperture of the flow regulator 27 thereby to vary the amount of permeated fuel gas. Thus, the intensity of the combustion reaction is adjusted so that the temperature of the solid electrolyte 2 can be controlled.

According to the above-described pressure controlling means 5, the pressure of the fuel gas on the anode-3 side is made greater than the pressure of the air on the cathode-side 4 so as to cause a part of the fuel gas to flow through the porous solid electrolyte 2 to the cathode-4 side. In the fuel cell 1, the fuel gas permeated to the cathode-4 side is mixed with the air present on the cathode-4 side and the resultant mixture can bring about the combustion reaction on the cathode-4 side. Hence, the solid electrolyte 2 is heated by the heat thus generated. Furthermore, the pressure controlling means 5 is also capable of controlling the rate of temperature rise of the solid electrolyte 2 by regulating the change rate of the differential pressure between the anode-3 side and the cathode-4 side. Thus, the solid electrolyte 2 may be prevented from being damaged by a rapid temperature rise.

When the fuel cell 1 generates the electric power by cell reacting the fuel gas on the anode-3 side with the oxygen on the cathode-4 side in this manner, a part of the fuel gas on the anode-3 side is caused to permeate through the solid electrolyte 2 toward the cathode-4 side and to be mixed with the oxygen so that the solid electrolyte 2 may be heated by the combustion reaction of the resultant mixture of the fuel gas and oxygen.

Furthermore, a part of the fuel gas on the anode-3 side permeates through the solid electrolyte 2 toward the cathode-4 side together with reacted gas resulting from the cell reaction. Then, the reacted gas resulting from the cell reaction and combusted gas resulting from the combustion on the cathode-4 side are discharged from the outlet port 13 on the cathode-4 side. The conventional apparatus has a problem that the reacted gas resulting from the cell reaction on the anode-3 side is mixed with the fuel gas as the fuel, causing the decrease of cell reaction efficiency. According to the invention, however, the reacted gas is caused to permeate toward the cathode-4 side so that the fuel cell is increased in the cell reaction efficiency.

According to the embodiment shown in FIG. 2, as described above, the second vacant chamber 15 constitutes a combustion chamber and the cathode 4 of the fuel cell 1 constitutes a combustion section undergoes the above-described combustion reaction of the fuel gas with the oxygen.

The cathode 4 laminated on the solid electrolyte 2 constitutes the combustion section and the combustion reaction of the fuel gas with the oxygen takes place in this section and in the neighborhood thereof. Therefore, the solid electrolyte 2 can be quickly heated to the high temperature with the heat resulting from the combustion reaction. The combustion reaction can provide a required energy for raising the solid electrolyte 2 to the high temperature for the proper ion conductivity.

The combustion section is disposed on the cathode-4 side and hence, the combustion reaction produces a large amount of intermediate products having high energy potentials, such as OH- and O-radicals, on the cathode-4 side while the combustion goes on. Therefore, the solid electrolyte is increased in oxygen ion conductivity (oxygen ions conducted to the anode-3 side). In addition, activation polarization in the cathode 4 can be suppressed so that the use of a catalyst used as an electrocatalyst may be reduced.

Further, the combustion reaction occurring in the combustion section may be flame combustion or flameless combustion. Since the solid electrolyte 2 as well as the anode 3 and the cathode 4 on the opposite sides thereof are porous masses, the fuel gas is allowed to permeate through the entire surfaces of the solid electrolyte 2 and these electrodes. Hence, the combustion reaction occurs on the overall surfaces of the fuel cell 1 so that the whole body of the solid electrolyte 2 can be quickly heated to the high temperature. In the case of the flame combustion, the flame is formed as diffusion flame or planar flame. From the viewpoint of heat conduction by the flame, the combustion section may preferably be disposed on a lower side of the solid electrolyte 2.

In this manner, the combustion section can constantly maintain the combustion reaction (flame) on the fuel cell 1 so that the solid electrolyte 2 can be heated to the temperature at which the solid electrolyte 2 is able to attain the proper ion conductivity.

Referring to FIG. 3, the fuel cell apparatus 31 includes ignition means 8 disposed on the anode-3 side or the cathode-4 side where the combustion reaction of the fuel gas with the oxygen takes place. In the embodiment shown in FIG. 2, the ignition means 8 is disposed on the cathode-4 side. The ignition means 8 may employ, for example, a spark plug which throws sparks to the cathode 4.

The combustion reaction of the fuel gas with the oxygen can be started by actuating the ignition means 8. At startup of the fuel cell apparatus 31 in particular, the combustion is started on the cathode-4 side by causing the fuel gas on the anode-3 side to permeate through the solid electrolyte 2 and actuating the ignition means 8. The heat from the combustion may be used for quickly heating the solid electrolyte 2 to a power generation temperature at which the solid electrolyte 2 is able to attain the effective ion conductivity. Namely, the apparatus is capable of quick startup.

In FIG. 3, the fuel cell apparatus 31 includes control means (controller) 7 for controlling the intensity of the combustion of the fuel gas and oxygen. The control means 7 controls the combustion intensity (the degree of combustion) thereby maintaining the solid electrolyte 2 at temperatures above the power generation temperature at which the solid electrolyte 2 is able to attain the effective ion conductivity. The fuel cell apparatus 31 is adapted for an arbitrary setting of the power generation temperature, which may be set according to a relation between the temperature and the ion conductive property of the solid electrolyte used, or the like. For example, the power generation temperature may be set to 300° C. or to a range of 800° C. to 1000° C.

A more detailed description is made on the temperature control of the solid electrolyte 2 provided by the control means 7.

The ion conductivity of the solid electrolyte 2 is dependent on the temperature of the solid electrolyte 2. Therefore, if the solid electrolyte 2 is decreased in the ion conductivity, the control means 7 provides control to increase the intensity of the combustion. Thus, the temperature of the solid electrolyte 2 is increased so that the solid electrolyte can attain the predetermined ion conductivity.

On the other hand, if the ion conductivity of the solid electrolyte 2 is increased to above the predetermined value, the control means 7 reduces the intensity of the combustion so that the fuel cell apparatus can maintain its power generation efficiency. Otherwise, the control means 7 may provide control to suspend the combustion thereby permitting the fuel cell 1 to perform the thermally self-sustained operation based on only the heat generated by the cell reaction in the fuel cell 1.

As described above, the control means 7 is arranged to control the intensity of the combustion of the fuel gas and oxygen according to the ion conductivity of the solid electrolyte 2.

Now, description is made on specific means for controlling the intensity of the combustion of the fuel gas and oxygen.

In order to control the intensity of the combustion, the control means 7 adjusts the amount of fuel gas or oxygen permeated through the solid electrolyte 2 by regulating the differential pressure between the anode-3 side and the cathode-4 side. Specifically, the differential pressure between the anode-3 side and the cathode-4 side causes the fuel gas to permeate through the solid electrolyte 2 and the amount of fuel gas permeating through the solid electrolyte 2 is adjusted by increasing or decreasing the differential pressure. Accordingly, the control means 7 makes adjustment of the amount of fuel gas permeated through the solid electrolyte 2 by regulating the differential pressure between the anode-3 side and the cathode-4 side or by regulating the differential pressure between the fuel gas side and the oxygen side, thereby accomplishing the control of the intensity of the combustion (flame).

More specifically, the fuel cell 1 is equipped with a temperature sensor 19 for making a temperature measurement on the solid electrolyte 2. The temperature sensor 19 inputs measurement results to the control means 7. The control means 7 compares a measurement value inputted from the temperature sensor 19 with a set value of the required temperature (power generation temperature) of the solid electrolyte 2, which is previously set in the control means 7. If the control means 7 determines that the measurement value is less than the set value, the control means 7 operates the pressure controlling means 5 so as to increase the differential pressure between the anode 3 and the cathode 4. Specifically, the control means 7 operates the gas supply controlling section 16 or(and) the air supply controlling section 17 and the exhaust controlling section 18 so that the pressure on the anode-3 side becomes even higher than the pressure on the cathode-4 side. Thus, the amount of fuel gas permeated through the solid electrolyte 2 is increased to accelerate the combustion reaction on the cathode-4 side, the heat from which is given to the solid electrolyte 2 to raise the temperature thereof to the set value.

If the control means 7 determines that the measurement value inputted from the temperature sensor is above the set value, the control means 7 operates the pressure controlling means 5 so as to reduce the differential pressure between the anode 3 and the cathode 4 or to reduce the differential pressure to zero. Specifically, the control means 7 operates the gas supply controlling section 16 or(and) the air supply controlling section 17 and the exhaust controlling section 18 so that the differential pressure between the anode-3 side and the cathode-4 side is decreased to such a value as not to cause the fuel gas to permeate through the solid electrolyte 2. Thus, the permeation of the fuel gas through the solid electrolyte 2 is reduced or stopped and hence, the combustion reaction on the cathode-4 side is slowed down or suspended.

Subsequently when the control means 7 determines that the measurement value inputted from the temperature sensor 19 is decreased to below the set value, a signal from the control means 7 drives the pressure controlling means 5 into the same operation as the above whereby a differential pressure to enable the permeation of the fuel gas through the solid electrolyte 2 is produced between the anode-3 side and the cathode-4 side. At the same time, the ignition means 8 is actuated to effect the combustion reaction on the cathode-4 side. Thus, the heat from the combustion on the cathode-4 side is applied to the solid electrolyte 2 for raising the solid electrolyte 2 to a temperature above the set value.

In this manner, the control means 7 can maintain the solid electrolyte 2 at the desired temperature or above by controlling the intensity of the combustion of the fuel gas and oxygen.

Now, description is made on specific examples of the solid electrolyte 2, the anode 3 and the cathode 4 provided in the fuel cell 1 of the invention.

Examples of the solid electrolyte 2 may include: zirconia solid electrolytes such as yttria-stabilized zirconia $Y_2O_3$—$ZrO_2$(YSZ) and Scandia-stabilized zirconia $Sc_2O_3$—$ZrO_2$ (ScSZ); lanthanum gallate solid electrolytes such as (La,Sr)(Ga,Mg,Co)$O_3$; and ceria solid electrolytes such as $Sm_2O_3$—$CeO_2$ (SDC), $Gd_2O_3$—$CeO_2$ (GDC) and $Y_2O_3$—$CeO_2$ (YDC).

Examples of the anode 3 (fuel electrode) may include: metals such as platinum, gold, silver, palladium, ruthenium and nickel; and metal oxides such as nickel oxide, cobalt oxide and copper oxide. Examples of a usable cermet may include: Ni—YSZ, Ni—Ce(Gd)$O_2$—YSZ, Ru—YSZ, Pt—YSZ, Cu—CeO$_2$—YSZ and the like.

Examples of the cathode 4 (air electrode) may include: metals such as platinum, gold, silver, palladium, ruthenium and nickel; and metal oxides such as nickel oxide, cobalt oxide and copper oxide; lanthanum manganites such as lanthanum strontium manganite (La)(Sr)MnO; lanthanum cobaltites such as lanthanum strontium cobaltite (La)(Sr)CoO$_3$ and (La,Sr)(Co,Fe)O$_3$ (LSCF); and the like. Examples of a usable cermet may include: Ni—YSZ, Ni—Ce(Gd)O$_2$—YSZ, Ru—YSZ, Pt—YSZ, Cu—CeO$_2$—YSZ and the like.

The configuration of the fuel cell 1 is described.

In FIG. 2, the solid electrolyte 2 may have a thickness of 10 μm to 1 mm. The solid electrolyte 2 can be minimized in thermal capacity by forming the solid electrolyte 2 in such a small thickness t1. Accordingly, the solid electrolyte 2 can be readily raised to the high temperature by the above combustion reaction. Hence, a small amount of energy (fuel gas) may be used for quickly imparting the proper ion conductivity to the solid electrolyte 2.

The fuel cell 1 including the anode 3 and the cathode can be reduced in thickness t2 to 0.5 mm to 3 mm.

Figure 4:
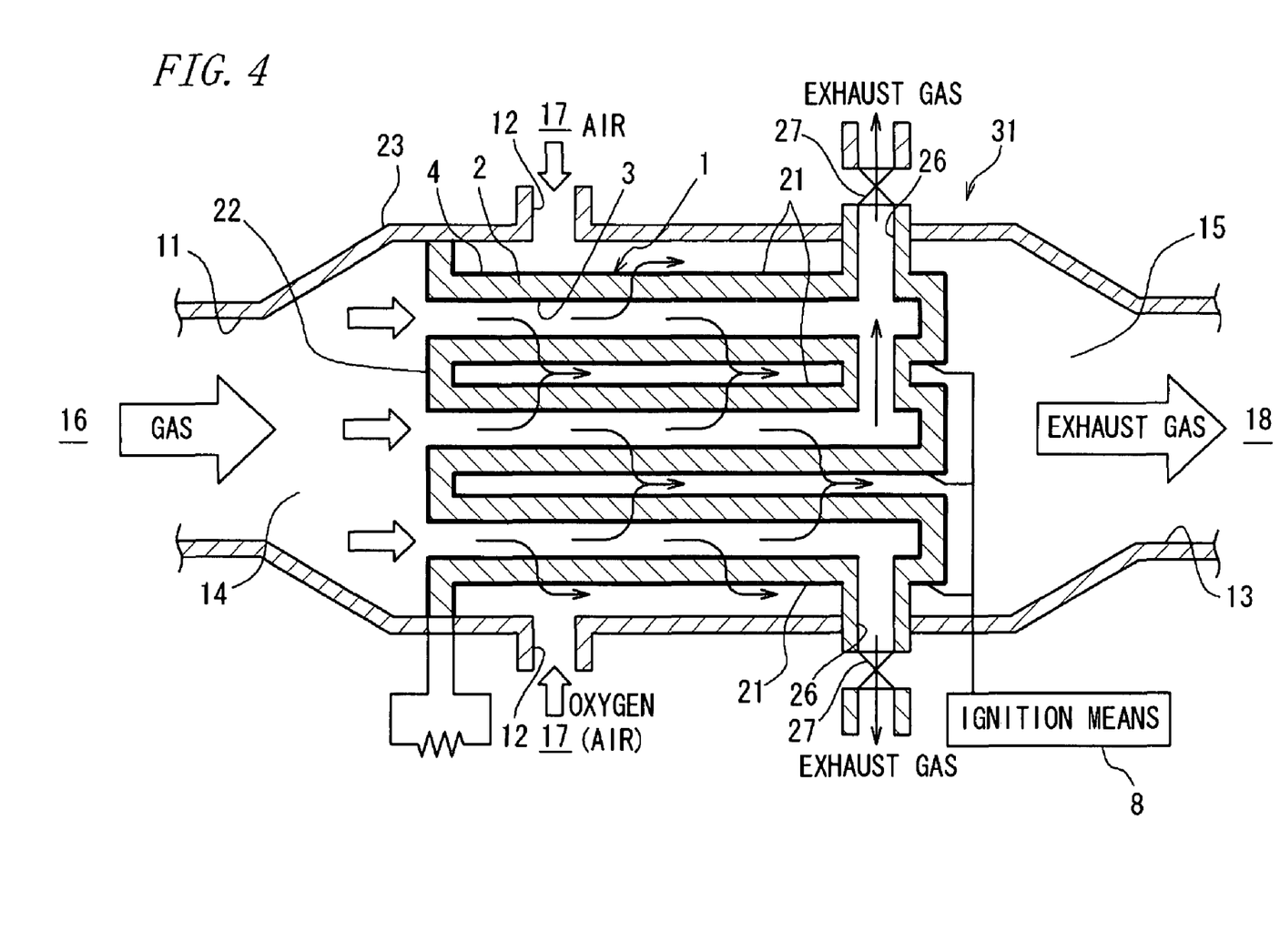
FIG. 4 is a sectional view schematically showing a fuel cell apparatus according to another embodiment of the invention.

FIG. 4 is a sectional view schematically showing a fuel cell apparatus employing a fuel cell 1 according to another embodiment of the invention. The fuel cell 1 has a configuration which includes a plurality of cylinder portions 21 shaped like a closed-end cylinder and a plate-like portion 22 interconnecting individual openings of the cylinder portions 21.

The cylinder portion 21 includes the anode 3 disposed on an inner periphery thereof, the cathode 4 disposed on an outer periphery thereof and the solid electrolyte 2 interposed between the inner periphery and the outer periphery thereof.

The fuel cell 1 is accommodated in a case 23, an interior of which is separated into the anode-3 side and the cathode-4 side by the fuel cell 1 just as in the embodiment of FIG. 2. In the case 23, the first vacant chamber 14 supplied with the fuel gas is defined on the anode-3 side and the second vacant chamber 15 supplied with air is defined on the cathode-4 side.

Provided on the anode-3 side of the case 23 are the first supply port 11 for supplying the fuel gas as the fuel to the anode-3 side (the first vacant chamber 14), the second supply port 12 for supplying air containing oxygen to the cathode-4 side (the second vacant chamber 15), and the outlet port 13 for discharging the exhaust gas (combusted gas) produced on the cathode-4 side (in the second vacant chamber 15).

The other parts and operations of the fuel cell apparatus equipped with this fuel cell 1 are the same as those of the above embodiment. The fuel cell apparatus is equipped with the temperature sensor 19, the pressure controlling means 5, the control means 7 and the ignition means 8 shown in FIG. 3.

The fuel cell apparatus of the foregoing embodiments perform the following fuel cell operating method. When the electric power is generated by cell reacting the fuel gas on the anode-3 side with the oxygen on the cathode-4 side by means of the solid electrolyte 2, the cell reaction is effected by supplying a part of the fuel gas or oxygen on one side to the other side as gaseous feed and heating the solid electrolyte 2 by the combustion reaction of the supplied fuel gas or oxygen with the oxygen or fuel gas. According to the individual embodiments shown in FIG. 2 and FIG. 4, the method of supplying the anode-3 side fuel gas to the cathode-4 side is to form the solid electrolyte 2 in a gas-permeable structure or a porous structure. Alternatively, the above method of supplying the anode-3 side fuel gas or the cathode-4 side oxygen may be implemented in a bypass pipe (not shown) equipped with a flow regulator and extended from the one side (the first vacant chamber 14) to the other side (the second vacant chamber 15) for communication between these chambers. Further, an alternative structure may be made such that a porous mass independent from the solid electrolyte 2 is disposed at a part of the fuel cell 1 and between the anode-3 side and the cathode-4 side so as to allow for the permeation of the fuel gas. The fuel gas includes a fuel mist.

In the solid oxide fuel cell capable of directly converting a chemical energy to an electric energy, such fuel cell apparatuses and fuel cell operating method are adapted to convert a part of the chemical energy to a thermal energy by combustion.

According to the apparatuses and method, the energy required for maintaining/heating the solid electrolyte 2 at/to the temperature to impart the proper ion conductivity to the solid electrolyte 2 can be obtained from the combustion reaction. Hence, the solid electrolyte 2 can be raised to the desired high temperature. What is more, the fuel gas and oxygen for effecting the cell reaction can also be used for this combustion reaction as they are in the case 10 (23). This negates the need for providing heating means such as a burner or heater, which is conventionally required as an additional component.

When the fuel cell apparatus starts up, this fuel cell operating method may preferably be used for effecting the above combustion reaction and heating the solid electrolyte 2. That is, the fuel cell apparatus of the invention can quickly raise the solid electrolyte 2 to the high temperature by using the above fuel cell operating method and thence is able to start power generation. The conventional fuel cell apparatus requires a startup time of 10 to 30 minutes between actuation and start of power generation. Even a small apparatus takes a startup time of 5 to 10 minutes. In contrast, the invention is adapted to reduce the startup time to 5 to 30 seconds because the solid electrolyte 2 can be quickly heated with the heat from the combustion reaction taking place in a part of the fuel cell 1. Thus, the invention achieves a quick startup.

Figure 5:
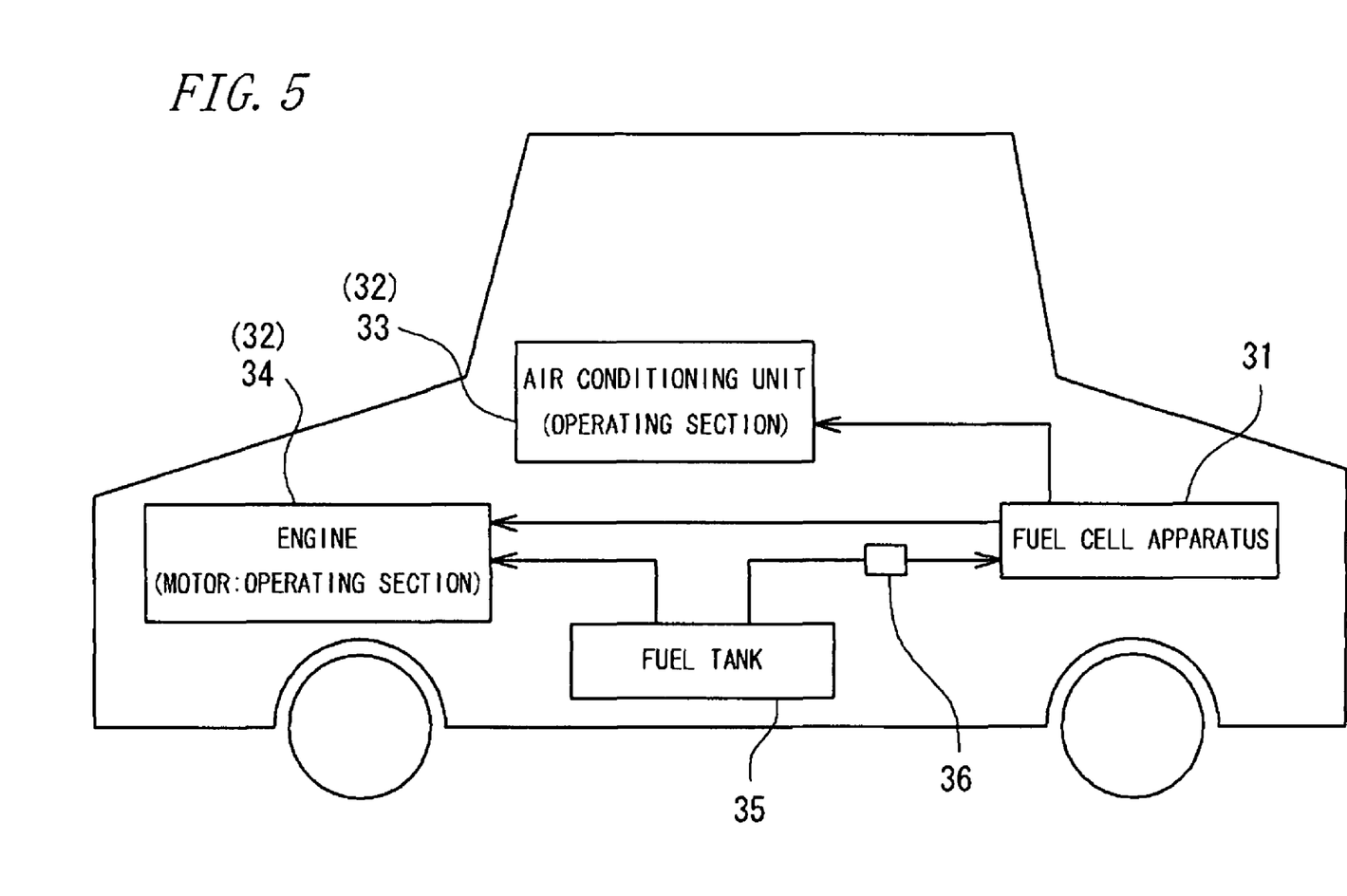
FIG. 5 is a schematic diagram illustrating an arrangement of a vehicle equipped with the fuel cell apparatus of the invention.

Now, a vehicle equipped with the fuel cell apparatus according to the above embodiment is described with reference to FIG. 5. The vehicle includes the above-described fuel cell apparatus 31 and an operating section 32 operating on the electric power generated by the fuel cell apparatus 31.

The description is made on a case where the operating section 32 is electric equipment mounted to the vehicle. While such electric equipment may be any of various apparatuses, the description is made on a case where the electric equipment is an air conditioning unit (car air-conditioner) 33. In this case, the fuel cell apparatus 31 may be used as an auxiliary power source for supplying the electric power to the air conditioning unit 33.

In order to operate the air conditioning unit 33 for cooling purpose, for example, the vehicle is conventionally required to maintain the engine in operation (idling state) even when the vehicle is parked. Namely, the air conditioning unit 33 is supplied with the electric power generated by rotating the engine. In a case where the vehicle is a taxi, in particular, the taxi waiting for a customer needs to maintain the engine in operation in order to operate the air conditioning unit 33 although the taxi is parked. In this manner, the taxi consumes a substantial amount of fuel for maintaining the engine in operation.

However, the fuel cell apparatus 31 may be mounted to the vehicle as the auxiliary power source (auxiliary power source for idling stop practice) such that the air conditioning unit 33 can operate on the electric power from the fuel cell apparatus 31 even though the engine is deactivated. The amount of fuel consumed for the power generation is less than that consumed for maintaining the engine 34 in operation.

Particularly, the taxi spends a long standing time waiting for a customer or such and hence, consumes much fuel for other than traveling. This problem can be solved by the invention. In summer time, for example, the invention permits the taxi to wait for a customer as deactivating an engine 34 but operating the air conditioning unit 33. Thus, the taxi can provide a comfortable in-car space to the customer at all times.

The vehicle further includes: a fuel tank 35 for storing a vehicle fuel; the engine 34 as a vehicle driving section operating on the vehicle fuel; and a fuel feeding section (pump) 36 for supplying a part of the vehicle fuel as the above fuel gas. The fuel feeding section 36 supplies a part of the vehicle fuel to the anode side of the fuel cell of the fuel cell apparatus 31. According to this arrangement, the fuel feeding section 36 supplies the vehicle fuel to the fuel cell apparatus 31 so that the fuel cell apparatus 31 can utilize a part of the vehicle fuel as the fuel gas for power generation.

In the case of an LPG (liquefied petroleum gas) vehicle or a CNG (compressed natural gas) vehicle, the vehicle fuel dedicated to the engine 34 may also be directly used by the fuel cell apparatus 31 as the fuel for power generation.

As another embodiment of the vehicle equipped with the fuel cell apparatus of the invention, an arrangement may be made such that the operating section 32 operating on the electric power generated by the fuel cell apparatus 31 is the vehicle driving motor 34 and that the fuel cell apparatus 31 serves as a primary power source for supplying the power to the motor 34.

Such a fuel cell vehicle (FCV) equipped with the fuel cell conventionally employs a proton exchange membrane fuel cell (PEMFC). This is because this fuel cell has a good startup performance, operating at temperatures on the order of 100° C. However, the fuel cell of the invention is capable of quick startup and hence, is usable as the primary power source.

Because of the following reasons, the conventional polymer electrolyte fuel cells are faced with difficulties in fuel production, transportation and storage method. The polymer electrolyte fuel cell is liable to be deteriorated in cell performance because a hydrogen-ion conductive polymer used therein is poor in long-term stability. Further, the polymer electrolyte fuel cell requires high-purity hydrogen of above 99.99% as the fuel. However, the solid oxide fuel cell of the invention features long-term stability and reliability as well as high energy conversion efficiency. In addition, the fuel cell of the invention can directly use a hydrocarbon fuel for vehicles as the fuel for cell reaction. Hence, the fuel cell of the invention may favorably be applied to the fuel cell vehicles.

Figure 6:
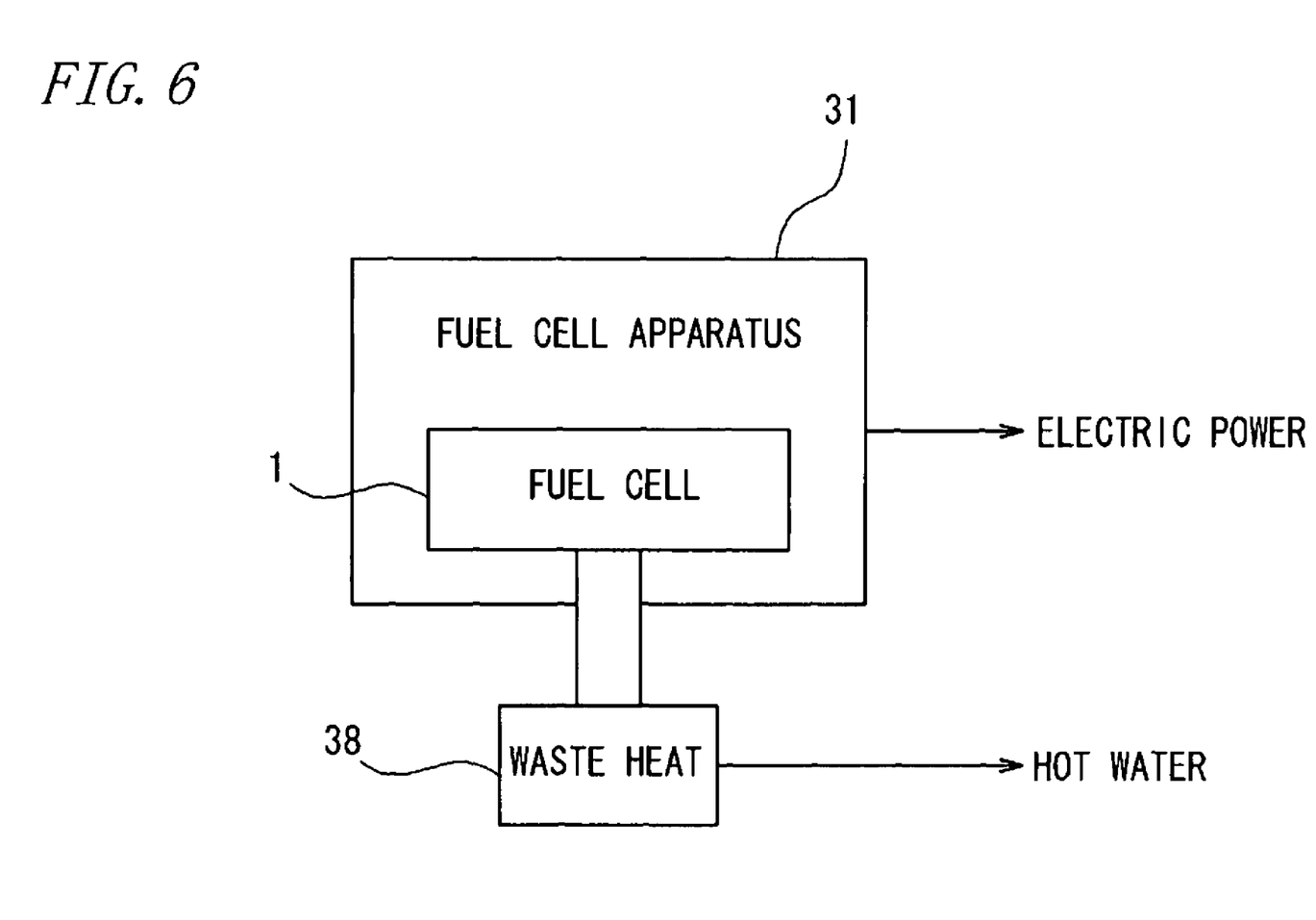
FIG. 6 is a schematic diagram illustrating an arrangement of a co-generation system employing the fuel cell apparatus of the invention.

Referring to FIG. 6, description is made on an embodiment where the fuel cell apparatus 31 of the invention is applied to an apparatus other than the vehicle. This fuel cell apparatus 31 may be applied to a co-generation system, for example. The co-generation system includes: the above fuel cell apparatus 31 and means (heat exchanger) 38 for utilizing the heat of the exhaust gas discharged from the fuel cell apparatus 31. The system features the quick startup of the fuel cell apparatus 31 and besides, is adapted to utilize the high-temperature waste heat from the fuel cell 1. Thus, the co-generation system can achieve even higher energy conversion efficiency.

As described above, the fuel cell apparatus of the invention may be applied or mounted to a variety of apparatuses. Since the fuel cell apparatus of the invention has the quick start-up performance and is capable of thermally self-sustained operation negating the need for the additional external heat source, the fuel cell apparatus may be used as a power generation system not only for small fixed-type apparatuses such as a household co-generation system but also for fuel cell vehicles.

The size of the fuel cell apparatus can range from a small scale on the order of 1 kw to a large scale. The fuel cell apparatus of the invention can use the hydrocarbon fuel as its fuel and is expected to achieve a power generation efficiency of above 50%. In the case of the fixed-type apparatus, this fuel cell apparatus provides for an effective utilization of the waste heat because the exhaust gas produced and discharged during power generation has such a high temperature. Hence, the fuel cell apparatus may favorably be applied to the co-generation system. Alternatively, a large-sized fuel cell apparatus may be combined with a gas turbine engine so as to further increase the power generation efficiency of a large power generation system.

The fuel cell of the invention is not limited to the illustrated embodiments but may be practiced in any other modes within the scope of the invention. Any of the anode, the cathode and a region of the solid electrolyte of the fuel cell may constitute the combustion section wherein the above-described combustion reaction of the fuel gas and oxygen takes place. While the combustion section is disposed on the cathode side in each of the foregoing embodiments, the combustion section may also be disposed on the cathode-side or at the region of the solid electrolyte.

A case where the combustion section is disposed on the anode side is explained with reference to FIG. 2 and FIG. 3. The pressure controlling means 5 may establish a state where the pressure (internal pressure) on the cathode-4 side (the air electrode) is higher than that on the anode-3 (the fuel electrode), causing the oxygen to permeate through the porous solid electrolyte 2 toward the anode-3 side. In this case, the ignition means 8 may be disposed on the anode-3 side and the control means 7 may provide the same control as in the foregoing embodiments. In view of the exhaust gas produced in the combustion section, it is preferred to dispose the combustion section on the cathode side or the air side because the exhaust gas resulting from the combustion reaction can be discharged together with residual air.

The region of the solid electrolyte may also constitute the combustion section. Specifically, both the fuel gas on the anode side and the oxygen on the cathode side may be allowed to permeate the porous solid electrolyte from the opposite sides thereof, so that the fuel gas and oxygen are mixed together in the region of the solid electrolyte and subjected the combustion reaction.

According to the invention as described above, the fuel gas and oxygen for effecting the cell reaction are used to bring about the combustion reaction in the fuel cell and the heat resulting from the combustion reaction can be applied to the solid electrolyte. Therefore, the solid electrolyte can be quickly raised to the high temperature.

What is claimed is:

1. A solid oxide fuel cell apparatus comprising a solid oxide fuel cell for generating electric power by cell reacting a fuel gas on an anode side with oxygen on a cathode side, wherein the solid oxide fuel cell includes a solid electrolyte allowing a part of the fuel gas or the oxygen to permeate therethrough as gaseous permeation between the anode side and the cathode side, and wherein the solid electrolyte is heated by combustion reaction effected by the fuel gas or the oxygen permeated through the solid electrolyte and mixed with the oxygen or the fuel gas, the solid oxide fuel cell allowing oxygen on the cathode side to be ionized to oxygen ions and conducted through the solid electrolyte to the anode, thereby cell reacting the oxygen ions with the fuel gas on the anode side for generating electric power, the heat from the combustion reaction used for quickly heating the solid electrolyte to a power generation temperature at which the solid electrolyte is able to attain effective ion conductivity, wherein the solid oxide fuel cell apparatus further comprises a control means for controlling an intensity of the combustion by regulating the differential pressure between the anode side and the cathode side to adjust the amount of fuel gas or oxygen permeated through the solid electrolyte.

2. A fuel cell apparatus according to claim 1, further comprising control means for maintaining the solid electrolyte at temperature above a power generation temperature by controlling the intensity of the combustion of the fuel gas and the oxygen, the power generation temperature at which the solid electrolyte can attain effective ion conductivity.

3. A fuel cell apparatus according to claim 2, wherein the control means controls the intensity of the combustion of the fuel gas and the oxygen according to the ion conductivity of the solid electrolyte.

4. A fuel cell apparatus according to claim 1, wherein the solid electrolyte is a porous mass.

5. A fuel cell apparatus according to claim 1, wherein any one of the anode, the cathode and a region of the solid electrolyte of the fuel cell constitutes a combustion section.

6. A fuel cell apparatus according to claim 5, wherein the combustion section is defined as a place where flames are formed.

7. A fuel cell apparatus according to claim 6, wherein the combustion section is a cathode.

8. A fuel cell apparatus according to claim 1, further comprising ignition means disposed on the anode side or the cathode side where the combustion reaction of the fuel gas and the oxygen takes place.

9. A vehicle comprising a fuel cell apparatus and an operating section operating on electric power generated by the fuel cell apparatus,
wherein the fuel cell apparatus includes a solid oxide fuel cell for generating the electric power by cell reacting a fuel gas on an anode side with oxygen on a cathode side, wherein the solid oxide fuel cell includes a solid electrolyte allowing a part of the fuel gas or the oxygen to permeate therethrough as gaseous permeation between the anode side and the cathode side, and wherein the solid electrolyte is heated by combustion reaction effected by the fuel gas or the oxygen permeated through the solid electrolyte and mixed with the oxygen or the fuel gas, the solid oxide fuel cell allowing oxygen on the cathode side to be ionized to oxygen ions and conducted through the solid electrolyte to the anode, thereby cell reacting the oxygen ions with the fuel gas on the anode side for generating electric power, the heat from the combustion reaction used for quickly heating the solid electrolyte to a power generation temperature at which the solid electrolyte is able to attain effective ion conductivity, wherein the fuel cell apparatus further comprises a control means for controlling an intensity of the combustion by regulating the differential pressure between the anode side and the cathode side to adjust the amount of fuel gas or oxygen permeated through the solid electrolyte.

10. A vehicle according to claim 9, further comprising:
a fuel tank for storing a vehicle fuel;
a vehicle driving section operating on the vehicle fuel; and
a fuel feeding section for supplying a part of the vehicle fuel as the fuel gas to the anode side of the solid oxide fuel cell provided in the fuel cell apparatus.

11. A co-generation system comprising a fuel cell apparatus and means for utilizing the heat of an exhaust gas discharged from the fuel cell apparatus,
wherein the fuel cell apparatus includes a solid oxide fuel cell for generating electric power by cell reacting a fuel gas on an anode side with oxygen on a cathode side, wherein the solid oxide fuel cell includes a solid electrolyte allowing a part of the fuel gas or the oxygen to permeate therethrough as gaseous permeation between the anode side and the cathode side, and wherein the solid electrolyte is heated by combustion reaction effected by the fuel gas or the oxygen permeated through the solid electrolyte and mixed with the oxygen or the fuel gas, the solid oxide fuel cell allowing oxygen on the cathode side to be ionized to oxygen ions and conducted through the solid electrolyte to the anode, thereby cell reacting the oxygen ions with the fuel gas on the anode side for generating electric power, the heat from the combustion reaction used for quickly heating the solid electrolyte to a power generation temperature at which the solid electrolyte is able to attain effective ion conductivity, wherein the fuel cell apparatus further comprises a control means for controlling an intensity of the combustion by regulating the differential pressure between the anode side and the cathode side to adjust the amount of fuel gas or oxygen permeated through the solid electrolyte.

12. A solid oxide fuel cell operating method comprising:
generating electric power by cell reacting a fuel gas on an anode side with oxygen on a cathode side by means of a solid electrolyte,
supplying a part of the fuel gas or the oxygen on one side to the other side so as to heat the solid electrolyte by combustion reaction of the supplied fuel gas or oxygen with the oxygen or the fuel gas, the solid oxide fuel cell allowing oxygen on the cathode side to be ionized to oxygen ions and conducted through the solid electrolyte to the anode, thereby cell reacting the oxygen ions with the fuel gas on the anode side for generating electric power, the heat from the combustion reaction used for quickly heating the solid electrolyte to a power generation temperature at which the solid electrolyte is able to attain effective ion conductivity, and
controlling an intensity of the combustion by regulating the differential pressure between the anode side and the cathode side to adjust the amount of fuel gas or oxygen permeated through the solid electrolyte.

13. A fuel cell operating method according to claim 12, wherein the solid electrolyte is heated by the combustion reaction when the fuel cell starts up.

* * * * *